(12) United States Patent
Haraguchi et al.

(10) Patent No.: US 6,882,133 B2
(45) Date of Patent: Apr. 19, 2005

(54) DC/DC CONVERTER CONTROL CIRCUITS AND DC/DC CONVERTER SYSTEMS WITH POWER SAVING MODE IN ACCORDANCE WITH AN EXTERNAL CONTROL SIGNAL

(75) Inventors: Akira Haraguchi, Kasugai (JP); Takashi Matsumoto, Kasugai (JP); Kyuichi Takimoto, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 26 days.

(21) Appl. No.: 10/134,751

(22) Filed: Apr. 30, 2002

(65) Prior Publication Data
US 2003/0098678 A1 May 29, 2003

(30) Foreign Application Priority Data
Nov. 27, 2001 (JP) .......................... 2001-361353
Feb. 26, 2002 (JP) .......................... 2002-049480

(51) Int. Cl.[7] .............................................. G05F 1/40
(52) U.S. Cl. ........................................ 323/284; 323/901
(58) Field of Search ............................. 713/340, 330, 713/323, 322; 323/901, 364, 369

(56) References Cited
U.S. PATENT DOCUMENTS
5,548,206 A * 8/1996 Soo ............................ 323/284

FOREIGN PATENT DOCUMENTS
JP 11-041914 2/1999

* cited by examiner

Primary Examiner—Shawn Riley
(74) Attorney, Agent, or Firm—Arent Fox, PLLC

(57) ABSTRACT

There are provided a DC/DC converter control circuit and a DC/DC converter system having high degree of freedom of mounting and achieving the following matters: (1) housing a DC/DC converter control circuit in a package miniaturized by reducing the number of terminals; and (2) starting-up a power saving mode in response to an input of an external control signal to a DC/DC converter system. A frequency setting terminal (RT) is connected to a resistance element RT and a switching section 1 in series, between the terminal and ground voltage. An external control signal CTL is inputted to the switching section 1. When an external control signal CTL turns off the switching section 1, connection to the ground voltage is opened and an oscillation driving section 4 does not operate. Thereby, power saving mode is kept. When the switching section 1 is turned on, connection to the ground voltage is closed and the oscillation driving section 4 starts up. Subsequently, a bias control section 5 starts up and bias condition toward the resistance element RT is controlled. Thereby oscillation frequencies approximate to a setting value. Control of power saving mode can be thus carried out without a dedicated terminal for an external control signal CTL.

33 Claims, 8 Drawing Sheets

CIRCUIT DIAGRAM SHOWING DC/DC CONVERTER SYSTEM OF FIRST EMBODIMENT

FIG.1 FIRST PRINCIPLE OF THE PRESENT INVENTION

FIG. 2 SECOND PRINCIPLE OF THE PRESENT INVENTION

FIG.3 CIRCUIT DIAGRAM SHOWING DC/DC CONVERTER SYSTEM OF FIRST EMBODIMENT

FIG. 4  CIRCUIT DIAGRAM SHOWING START-UP CONTROL SECTION OF DC/DC CONVERTER DIRECTED TO SECOND EMBODIMENT

OPERATIONAL WAVEFORM OF BIAS CURRENT AT THE TIME OF START-UP WITH RESPECT TO SECOND EMBODIMENT

CIRCUIT DIAGRAM SHOWING START-UP CONTROL SECTION OF DC/DC CONVERTER DIRECTED TO THIRD EMBODIMENT

FIG.7 PRIOR ART  CIRCUIT DIAGRAM SHOWING CONVENTIONAL DC/DC CONVERTER SYSTEM

CIRCUIT DIAGRAM SHOWING START-UP CONTROL SECTION OF CONVENTIONAL DC/DC CONVERTER

DC/DC CONVERTER CONTROL CIRCUITS AND DC/DC CONVERTER SYSTEMS WITH POWER SAVING MODE IN ACCORDANCE WITH AN EXTERNAL CONTROL SIGNAL

BACKGROUND OF THE INVENTION

1. Field of the Invention

The present invention relates to DC/DC converter control circuits and DC/DC converter systems with function entering a power saving mode in accordance with an external control signal. More specifically, it relates to DC/DC converter control circuits and DC/DC converter systems used for compact-type electric appliances.

2. Description of Related Art

Recent years, even higher performance and improvement of portability have been demanded for portable type electric appliances such as note-type personal computer, cellular phones, and the like. Accordingly, miniaturization of respective electronic components has been required more and more. Furthermore, improvement of continuous duty time while a battery is driven has also been demanded and respective electronic components have been required to lower current consumption, as well.

Furthermore, the improvements such as above are demanded for not only portable type electric appliances but also non-portable type ones such as personal computers forwarding further higher performance. Demand on improvements of LCD (liquid crystal display) widely used for desk-top-type personal computer is a good example of it. More specifically, a bias power source such as backlight for LCD is forcedly mounted on a narrow space provided around outer periphery of the display to obtain a display space as large as possible in a limited area and therefore, high density mounting on a limited small space provided around outer periphery of LCD is highly demanded for desk-top-type personal computers. Furthermore, on higher demands of environmental protection and resource conservation of recent years, there has been required power saving function to stop operation of backlight function for an LCD, a drive for hard disk motor, and the like with appropriate timing and additionally required power saving operation to lower power consumption at minimum essential with respect to DC/DC converter control circuits and DC/DC converter systems which drive the backlight function and the drive.

In a control circuit 800 for a DC/DC converter system 900 as shown in FIG. 7, switching frequency is determined depending on a resistance value of frequency setting resistance RT connected to an oscillating frequency setting terminal (RT). In the DC/DC converter system 900, there is arranged a control terminal (CTL) as a control terminal for power saving mode. An external control signal CTL to be inputted to this control terminal (CTL) controls a bias circuit BIAS via a control terminal (CTL) for control circuit 800, whereby to start-up a bias current generating circuit 110 constituted by the bias circuit BIAS and a PNP bipolar transistor Q10. Provided that an external control signal CTL is positive logic, the bias current generating circuit 110 is activated in response to an external control signal CTL of high logic level, whereby bias current is supplied to various circuit blocks arranged in the control circuit 800. On the other hand, provided that it is an external control signal CTL of low logic level, the bias current generating circuit 110 is inactivated, whereby supply of bias current to the various circuit blocks in the control circuit 800 is stopped and the DC/DC converter system 900 in active state shifts to power saving mode.

FIG. 8 shows a specific example of a start-up control section constituted by a bias circuit BIAS, and PNP bipolar transistors Q3, Q10. Start-up of a reference voltage circuit VREF is made by this start-up control section. In the next paragraph, a description of the start-up control section will be made provided that an external control signal CTL is positive logic.

An external control signal CTL inputted from a control terminal (CTL) is divided by resistance elements RB1 and RB1 in a meaning of electrical potential, whereby divided voltage Va is obtained and inputted to a base terminal of an NPN bipolar transistor QB1. In case the divided voltage Va is same as or higher than forward voltage VBE with respect to emitter voltage of the NPN bipolar transistor QB1, the NPN bipolar transistor QB1 becomes conductive and there flows bias current I100 determined and obtained by the emitter voltage and the resistance element RB3. The bias current I100 is outputted as bias current I200 through a current mirror circuit constituted by PNP bipolar transistors Q10, and Q3. An emitter terminal of the PNP bipolar transistor Q10 and that of the PNP bipolar transistor Q3 are connected to a diode element DB3 (forward voltage is VBE), and a resistance element RB4 (resistance value is RB4), respectively. The bias current I200 is constant current determined by a value of VBE/RB4. The bias current I200 starts up the reference voltage circuit VREF. Diode elements DB1 and DB2 are arranged in serial in the way of a line between a base terminal of the NPN bipolar transistor QB1 and ground voltage, thereby serving as clamp circuit to avoid over voltage application to the base terminal of the NPN bipolar transistor QB1.

In the DC/DC converter system of FIG. 7, an external control signal CTL inputted from the control terminal (CTL) is inputted to the control circuit 800 through its control terminal (CTL) so that power saving mode operation for the control circuit 800 can be controlled. However, the control circuit 800 must include the control terminal (CTL) as its dedicated terminal to control ON/OFF of power saving mode in the control circuit 800. In this case, provided that the control circuit 800 is housed in a package constituted by semiconductor integrated circuits and the like, this package must include its dedicated control terminal (CTL), which causes unfavorable enlargement of package size.

Regardless of portable or non-portable type, miniaturization has been highly demanded for electronic components nowadays. To meet the demands, there is a fear that the dedicated terminal for the control circuit 800 significantly obstructs downsizing of package size for housing the control circuit 800. Due to the existence of the dedicated terminal, degree of freedom of mounting the DC/DC converter system 900 on a narrow open space provided around outer periphery of LCD is limited, which is problematic in terms higher density mounting.

SUMMARY OF THE INVENTION

The present invention, attempted to resolve the above-noted problems with the prior art, is intended to provide a DC/DC converter control circuit and a DC/DC converter system having high degree of freedom of mounting and achieving the following matters: (1) housing a DC/DC converter control circuit in a package miniaturized by reducing the number of terminals; and (2) starting-up a power saving mode in response to an input of an external control signal to a DC/DC converter system; and (3) outputting stable voltage regardless of signal conditions of external terminals.

In order to achieve the above-stated object, the present invention provides a DC/DC converter control circuit. The DC/DC converter control circuit is capable of switching internal operation state between an active state and a non-active state. Furthermore, the circuit includes a frequency setting terminal for externally connecting an external impedance element to a point between the frequency setting terminal and external predetermined voltage, and a bias section for getting the external impedance element biased. The bias section is connected to the frequency setting terminal. The circuit also includes an oscillation driving section for controlling oscillation frequencies depending on an impedance value of the external impedance element. The oscillation driving section is connected to the external impedance element through the bias section. The DC/DC converter control circuit further includes a control section for controlling the internal operation, the control section being activated based on a signal from the oscillation driving section, and an auxiliary activator section for keeping the bias section in an active state when the internal operation is in a non-active state. The oscillation driving section starts-up when a path between the frequency setting terminal and the external predetermined voltage which passes through the external impedance element is closed to be conductive by an external switching section which opens and closes the path.

Furthermore, the present invention is directed to a DC/DC converter system capable of switching internal operation state between active state and non-active state. The DC/DC converter system has a DC/DC converter control circuit with a bias section for getting a frequency setting terminal biased and an oscillation driving section connected to the frequency setting terminal through the bias section, and an impedance element for controlling oscillation frequencies of the oscillation driving section depending on an impedance value. The impedance element is connected to a point between the frequency setting terminal and predetermined voltage. The DC/DC converter system further has a control section for controlling the internal operation, and an auxiliary activator section for keeping the bias section in an active state when the internal operation is in a non-active state. The control section is activated based on a signal from the oscillation driving section, and the oscillation driving section starts-up when a path between the frequency setting terminal and the predetermined voltage which passes through the impedance element is closed to be conductive by a switching section which opens and closes the path.

Furthermore, the present invention is directed to a DC/DC converter control circuit capable of switching internal operation state between active state and non-active state. The DC/DC converter control circuit includes a frequency setting terminal for externally connecting an external resistance element to a point between the frequency setting terminal and external predetermined voltage, a transistor for getting the external resistance element voltage biased, the transistor being connected to the frequency setting terminal, and an oscillation current source for controlling oscillation frequencies by outputting bias current depending on a resistance value of the external resistance element, the oscillation current source being connected to the external resistance element through the transistor. The DC/DC converter control circuit further includes a bias control section for controlling and adjusting voltage bias of the external resistance element to a predetermined voltage value by controlling the transistor. The bias control section is activated based on bias current from current source connected to the oscillation current source in a manner of mirror connection. The DC/DC converter control circuit also includes other control sections for controlling the internal operation, the other control sections being activated based on bias current from current source connected to the oscillation current source in a manner of mirror connection, and a bias resistance element for getting the transistor biased when the bias control section is in a non-active state. The oscillation current source starts-up when a path between the frequency setting terminal and the external predetermined voltage, which passes through the external resistance element, is closed to be conductive by an external switching transistor which opens and closes the path.

Still further, the present invention provides a DC/DC converter system capable of switching internal operation state between active state and non-active state. The DC/DC converter system includes a DC/DC converter control circuit with a transistor for getting a frequency setting terminal voltage biased and an oscillation current source connected to the frequency setting terminal through the transistor, and a resistance element for controlling oscillation frequencies of the oscillation current source depending on a resistance value. The resistance element is connected to a point between the frequency setting terminal and predetermined voltage. The DC/DC converter system further includes a bias control section for controlling and adjusting voltage bias of the resistance element to a predetermined voltage value by controlling the transistor, the bias control section being activated based on bias current from current source connected to the oscillation current source in a manner of mirror connection, other control sections for controlling the internal operation at the DC/DC converter control circuit, the other control sections being activated based on bias current from current source connected to the oscillation current source in a manner of mirror connection, and a bias resistance element for getting the transistor biased when the bias control section is in a non-active state. The oscillation current source starts-up when a path between the frequency setting terminal and the predetermined voltages which passes through the resistance elements is closed to be conductive by a switching transistor which opens and closes the path.

In the DC/DC converter control circuit or the DC/DC converter system directed to the another aspect of the present invention, the external switching transistor or the switching transistor is closed thereby to start up the oscillation current source via the transistor kept in an active state by the bias resistance element when the bias control section is in a non-active state. Consequently, the bias control section and the other control sections are activated based on bias current from the current source connected to the oscillation current source in a manner of mirror connection. It should be noted that the external switching transistor or the switching transistor is arranged in a path between the frequency setting terminal and the external predetermined voltage or the predetermined voltage in the DC/DC converter control circuit whereas in a path between the frequency setting terminal connected to the resistance element and the predetermined voltage in the DC/DC converter system.

Start-up/stop control of the DC/DC converter control circuit or the DC/DC converter system is made by connection control to the frequency setting terminal of the resistance element or the like which controls oscillation frequencies. Thus, frequency setting terminal can control both oscillation frequencies and start-up control of the DC/DC converter control circuit and the DC/DC converter system. Thereby, no control terminal dedicated to start-up/stop is required and the number of terminals of the DC/DC converter control circuit can be reduced, which realizes miniaturization of a package size of the DC/DC converter control circuit. Consequently, degree of freedom of mounting with respect to the DC/DC converter system can be enhanced.

There is provided a DC/DC converter system, in accordance with a third aspect of the present invention, capable of switching internal operation state between active state and non-active state, wherein the DC/DC converter control circuit includes a reference voltage section, and types of driving bias for driving the reference voltage section are switched at the time of start-up and after start-up where internal operation is in an active state.

In the DC/DC converter control circuit directed to the third aspect of the present invention, the reference voltage section is surely started-up by driving bias set at the time of start-up and is stably driven by driving bias set after start-up where internal operation is in an active state.

Thereby, as long as level of driving bias is set large, the reference voltage section can be started-up for sure with transient start-up driving bias. Furthermore, in case internal operation after start-up is in an active state, the reference voltage section can be driven with stable driving bias, whereby stable operation of the reference voltage section can be realized.

The above and further objects and novel features of the invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
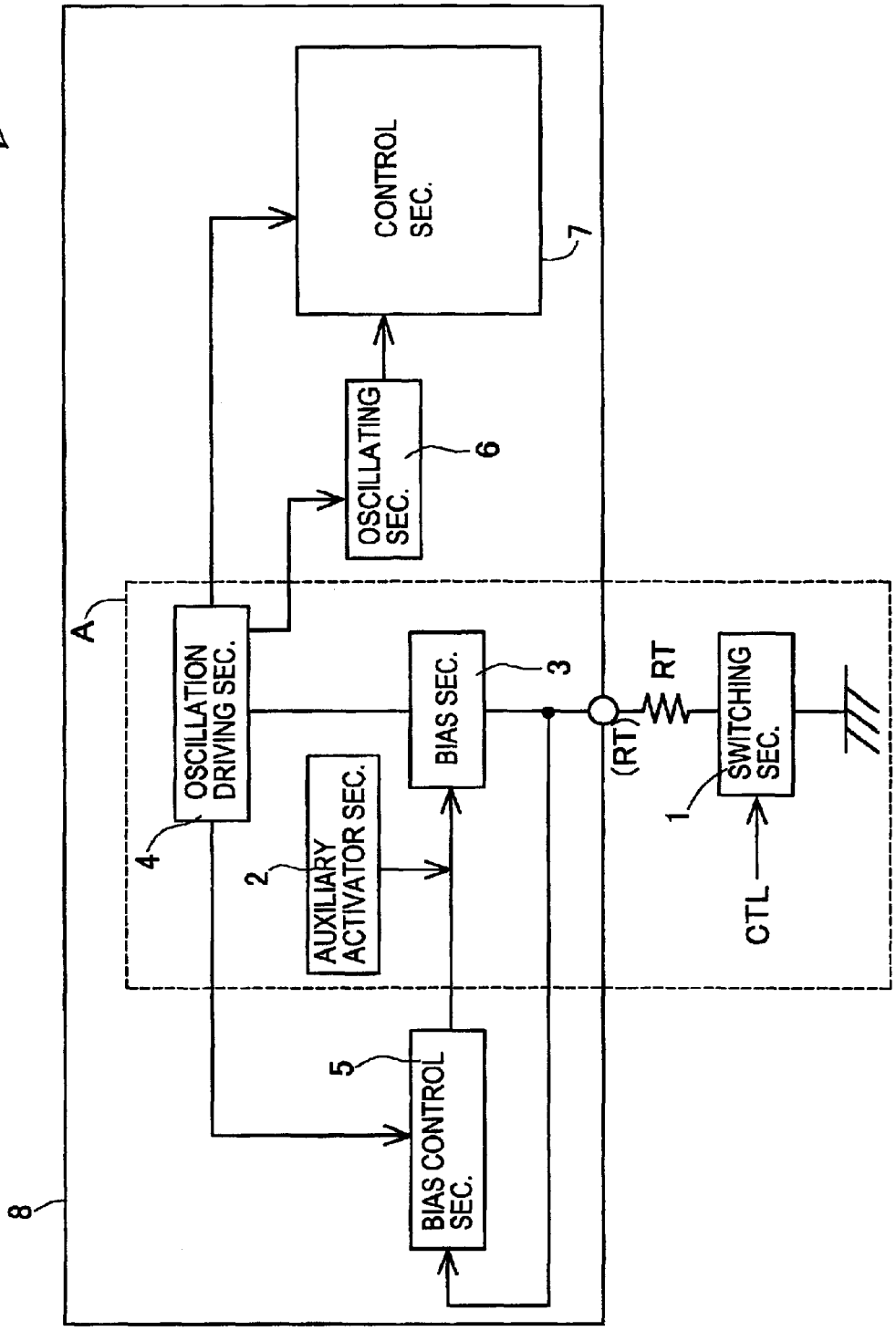
FIG. 1 shows a diagram showing a first principle of the present invention.

FIG. 1 shows a first principle of the present invention wherein a DC/DC converter system 9 including a DC/DC converter circuit 8 is shown. A frequency setting terminal (RT) for the DC/DC converter control circuit is connected to a resistance element RT as external impedance element and a switching section 1 in series, between ground voltage. An external control signal CTL is inputted to the switching section.

In the DC/DC converter circuit 8, the frequency setting terminal (RT) is connected to an oscillation driving section 4 through a bias section 3 and a signal value of the frequency setting terminal (RT) is connected to a bias control section as feedback signal. Signals from an auxiliary activator section 2 and the bias control section 5 are inputted to the bias section 3. Furthermore, the oscillation driving section 4 supplies a driving signal to the bias control section 5 and a control section 7.

The switching section 1 conducts switching control of connection between the frequency setting terminal (RT) and the ground voltage. The switching control is conducted following an external control signal CTL which controls activation/non-activation of the DC/DC converter system 9. The auxiliary activator section 2 supplies bias to the bias section 3 so that the bias section 3 can be kept active state while the DC/DC converter system 9 is non-active state. Power source voltage or ground voltage (not shown) is typical bias supply source. The bias section 3 arranged between the frequency setting terminal (RT) and the oscillation driving section 4 works to adjust bias condition of the resistance element RT so that oscillation frequency can be set appropriately depending on a resistance value of the resistance element RT to be connected to the frequency setting terminal (RT). The bias section 3 is controlled by the bias control section 5 where a signal value of the frequency setting terminal (RT) is applied as feedback signal. For example, in case oscillation frequency is controlled in accordance with a current value flowing in the oscillation driving section 4, a voltage value to be applied to the frequency setting terminal (RT) is controlled. Furthermore, in case oscillation frequency is controlled in accordance with a voltage value to be applied to the oscillation driving section 4, a current value flowing in the frequency setting terminal (RT) is controlled.

The oscillation driving section 4 supplies activating signals to all of the structural elements of the DC/DC converter control circuit 8 including the oscillating section 6. The structural elements other than the oscillating section 6 in the DC/DC converter control circuit 8 are the bias control section 5 and control section 7. Oscillation frequency of the oscillating section 6 is set depending on a resistance value of the resistance element RT connected to the frequency setting terminal (RT) based on bias condition toward the frequency setting terminal (RT) controlled by the bias control section 5 and driven by the bias section 3. The control section conducts all of the control operations required for regulating operation of output voltage (not shown) which constitutes the DC/DC converter system 9. For example, control operations include error-amplifying control, switching duty-generating control, driving control of an output transistor, and the like.

The DC/DC converter control circuit 8 does not include a dedicate terminal for directly inputting an external control signal CTL as control signal which realizes power saving mode of the DC/DC converter system 9 by controlling active/non-active state of the system. Instead, an external control signal CTL is inputted to the switching section 1 arranged in the external of the DC/DC converter control circuit 8.

In case power saving mode is executed by an external control signal CTL and the DC/DC converter system 9 keeps non-active state, the switching section 1 is turned off. Thereby, the connection between the resistance element RT and the ground voltage is opened. Accordingly, connections from the oscillation driving section 4 to the ground voltage via the resistance element RT and the bias section 3 are not established, whereby the oscillation driving section 4 does not operate. As a result, the oscillation driving section 4 does not output a start-up signal to activate the oscillating section 6, the bias control section 5 and the controls section 7. That is, current consumption is stopped and power saving state is kept.

In case normal operation state is executed by an external control signal CTL and the DC/DC converter system 9 operates in active state, the switching section 1 is turned on. Thereby, the connection between the resistance element RT and the ground voltage is closed. Accordingly, connections from the oscillation driving section 4 to the ground voltage via the resistance element RT and the bias section 3 are established. Thereby, the oscillation driving section 4 is activated and a start-up signal is outputted to activate the oscillating section 6 as well as the bias control section 5 and the control section 7. Immediately after a start-up state starts, oscillation frequency of the oscillating section 6 is not accurately controlled. However, the bias control section 5 activated along with start-up of the oscillation driving section 4 controls bias condition of the resistance element RT connected to the frequency setting terminal (RT). Thereby, a resistance value of the resistance element RT as well as a driving signal of the oscillation driving section are adjusted. As a result, the oscillating section 6 oscillates with frequencies set by the resistance element and the DC/DC converter system 9 shifts to a normal steady state.

As described, even if the DIC/DC converter circuit 8 does not include a dedicated terminal for inputting an external control signal CTL, control of active/non-active state along with the power saving function can be conducted. It should be noted that start-up of component elements surrounded with broken line indicated as a region A are controlled by an external control signal CTL.

Figure 2:
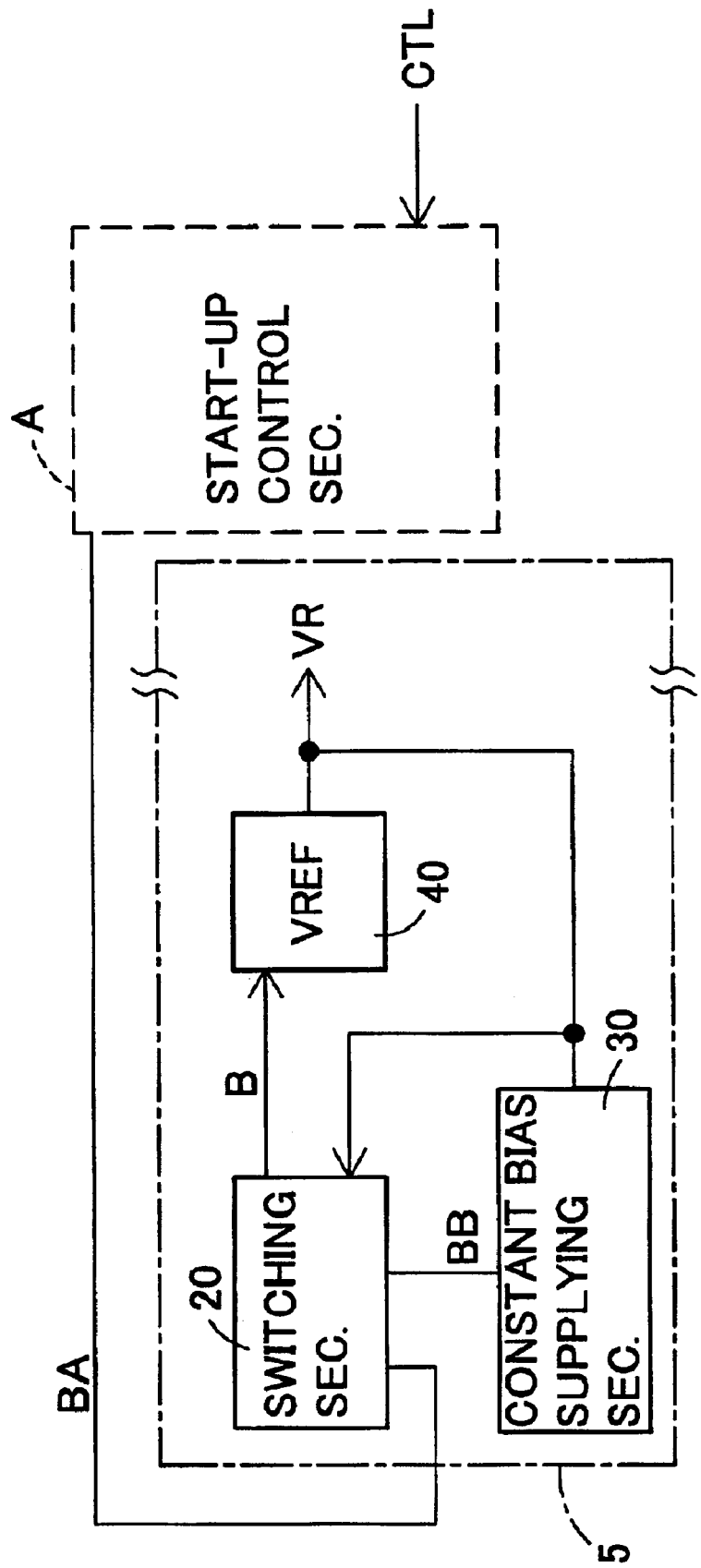
FIG. 2 shows a diagram showing a second principle of the present.

FIG. 2 shows a second principle of the present invention. More specifically, relationship of a start-up control section A' and a bias control section 5 in a DC/DC converter control circuit. The bias control section is structured in same manner as the first principle.

Start-up driving bias BA supplied from the start-up control section A' at the time of start-up and constant driving bias BB supplied from a constant bias supplying section 30 during active period are inputted to the switching section 20. The switching section 20 selects one of the driving bias BA and BB, thereby to supply driving bias B to reference voltage section (VREF) 40. The reference voltage section (VREF) 40 is driven by the driving bias B thereby to output reference voltage VR. The reference voltage VR is inputted to both the switching section 20 and the constant bias supplying section 30.

When the start-up control section A' is started-up by an external control signal CTL, the start-up control section A' gives an instruction to start oscillation operation and outputs various bias, thereby to start-up an internal circuit in the DC/DC converter control circuit. Furthermore, the start-up driving bias BA is also outputted, thereby to get the reference voltage section (VREF) 40 biased through the switching section 20. It should be noted that since the start-up driving bias BA is set to a bias value high enough for the reference voltage section (VREF) 40 to drive and start-up to target level of reference voltage VR, level of the reference voltage VR rises gradually.

When the reference voltage section (VREF) 40 is started-up by the start-up driving bias BA and the reference voltage gradually rises to reach a predetermined voltage value, the constant bias supplying section 30 is activated and the constant driving bias BB is outputted therefrom. Thereby, the switching section 20 works to switch types of the driving bias to the constant driving bias BB from the start-up driving bias BA. After that, a predetermined level of the constant driving bias BB outputted from the constant bias supplying section 30 is supplied to the reference voltage section (VREF) 40. The reference voltage section (VREF) 40 is driven with the predetermined level of the driving bias B, thereby to output a predetermined level of the reference voltage VR.

As described in the above, in the second principle of the present invention, the start-up driving bias BA transiently supplied by the start-up control section A' at the time of start-up is surely started up, and the constant bias supplying section 30 starts-up and a predetermined level of the constant driving bias BB is outputted at a point where, after start-up of the reference voltage section (VREF) 40, the reference voltage VR rises to reach a predetermined voltage level. Then, the switching section 20 driving bias B for the reference voltage section (VREF) 40, whereby the reference voltage section (VREF) 40 can be driven with a predetermined level of the driving bias B depending on level of target reference voltage VR outputted from the reference voltage section (VREF) 40 in a stable activating state. Since the target level of the reference voltage VR changes a little, change of bias value with respect to the predetermined level of driving bias B can be suppressed. Thereby, the reference voltage section (VREF) 40 can be driven stably, and change of a temperature characteristic with respect to the reference voltage VR and change of voltage value can be suppressed.

Next, first through third embodiments of an inventive DC/Dc converter control circuit and DC/Dc converter system will be described by referring to FIG. 3 through FIG. 6.

Figure 3:
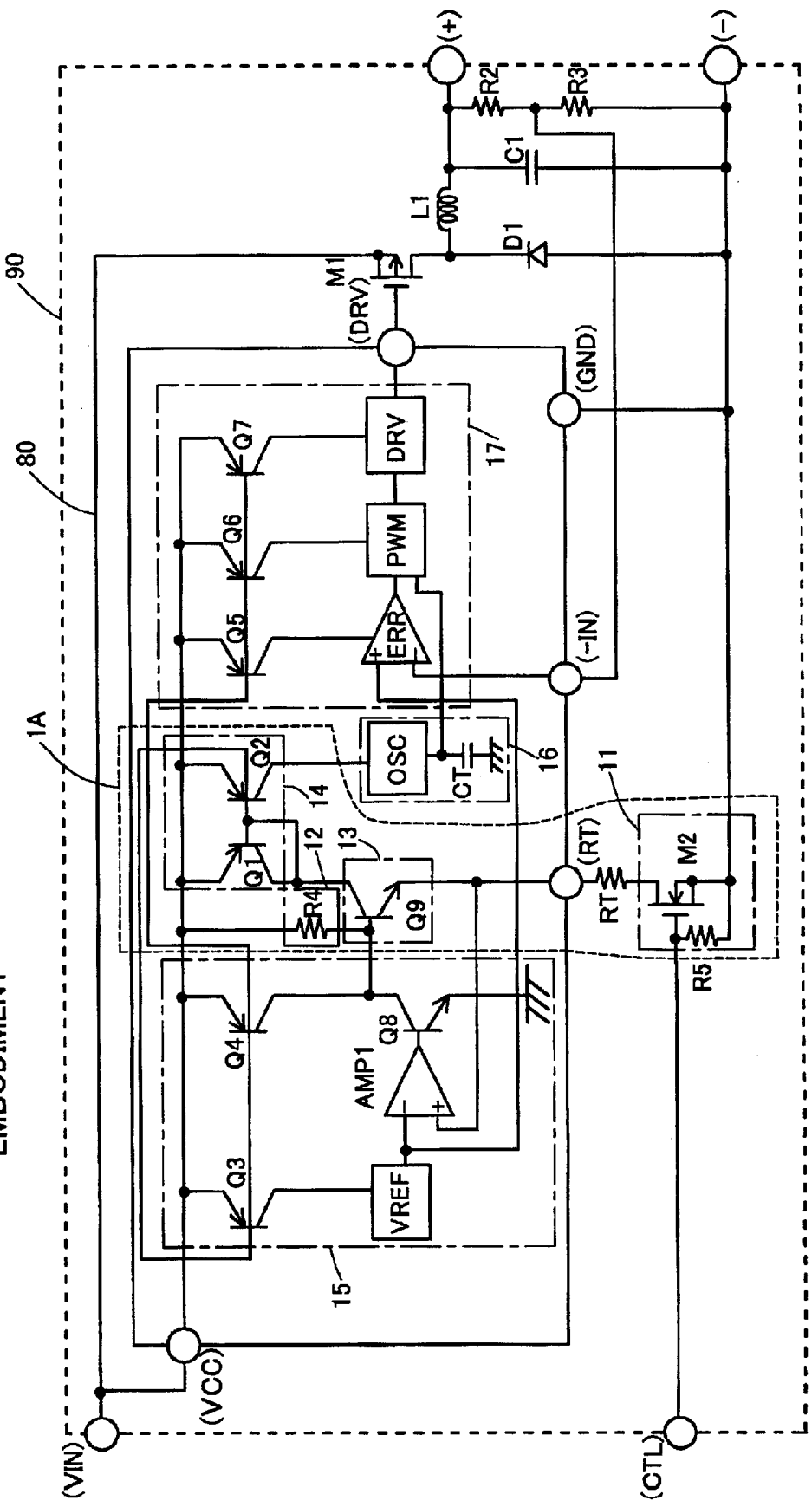
FIG. 3 is a circuit diagram showing a DC/DC converter system of a first embodiment.

FIG. 3 shows a circuit diagram of a DC/DC converter system 90 directed to a first embodiment. By referring to FIG. 3, a step-down type switching power source will be described. Output voltage is outputted to a portion between a (+) terminal and a (−) terminal of the DC/DC converter system 90. Output voltage is obtained such that a capacitor C1 smoothes electric energy stored in a coil L1 from one end of the coil L1. The other end of the coil L1 is indirectly connected to an input power source VIN through a PMOS transistor M1 as well as to ground voltage through a diode element D1. The PMOS transistor M1 conducts switching control to connect between the coil L1 and the input power source VIN. The ground voltage is arranged to fly-back electric energy stored in the coil L1 through the diode element D1. Input voltage VIN is inputted to a (VIN) terminal of the DC/DC converter system 90 as well as inputted to a (VCC) terminal to supply power source voltage VCC to the entirety of the DC/DC converter control circuit 80. Resistance elements R2 and R3 which divide the output voltage in a meaning of electrical potential are arranged for detecting output voltage. Thereby, divided voltage is feed-back to the DC/DC converter control circuit 80 so as to control switching duty of the PMOS transistor M1 for keeping the output voltage constant.

Respective control circuit arranged in the DC/Dc converter control circuit 80 is activated by PNP bipolar transistors Q3 through Q7. The PNP bipolar transistors Q3 through Q7 constitute a constant current circuit to which PNP bipolar transistor Q1 and Q2 constituting a constant current source circuit arranged as oscillation driving section 14 is connected in a manner of mirror connection. In this constant current source circuit, respective emitter terminals of the PNP bipolar transistors Q1 through Q7 are connected to the power source voltage VCC and their base terminals are connected to one another in common as well as to a collector terminal of the PNP bipolar transistor Q1. Presence/absence of current from each of the transistors Q2 through Q7 is controlled depending on presence/absence of current into the collector terminal of the PNP bipolar transistor Q1.

The collector terminal of the PNP bipolar transistor Q1 is connected to a collector terminal of an NPN bipolar transistor Q9 an emitter terminal of which is connected to the frequency setting terminal (RT) of the DC/DC converter control circuit 80. The NPN bipolar transistor Q9 constitutes a bias section 13. The power source voltage VCC is connected to a base terminal of the NPN bipolar transistor Q9 through a resistance element R4, thereby to constitute an auxiliary activator section 12 or a bias supply element 12. Moreover, the base terminal of the NPN bipolar transistor Q9 is further connected to a bias control section 15 (mentioned later) so as to work as a drive transistor for fixing terminal voltage at the frequency setting terminal (RT) to predetermined voltage.

The PNP bipolar transistor Q2 is a constant current source which allows bias current to flow in an oscillation circuit 16. Oscillating frequencies is determined by capacitance of a capacitor CT constituting the oscillation circuit 16 and a value of bias current outputted from the PNP bipolar transistor Q2. Full-charging operation toward the capacitor CT is controlled by a control section of the oscillation circuit based on bias current so that the oscillation circuit 16 can be controlled to obtain angular oscillating waveforms.

The PNP bipolar transistor Q3 supplies bias current toward the reference voltage circuit VREF which generates reference voltage required for internal circuits of the DC/DC converter control circuit 80 to generate reference voltage. Furthermore, the PNP bipolar transistor Q4 is connected to the base terminal of the NPN bipolar transistor Q9 as well as to the collector terminal of the NPN bipolar transistor Q8, thereby to work as bias current source of the NPN bipolar transistor Q8 which is an output stage transistor of an operational amplifier AMP1. An inversion input terminal of the operational amplifier AMP1 is connected to reference voltage from the reference voltage terminal VREF whereas a non-inversion input terminal of that is connected to the frequency setting terminal (RT). The PNP bipolar transistors Q3, Q4, the reference voltage circuit VREF, the operational amplifier AMP1, and the NPN bipolar transistor Q8 constitute a bias control section 15. The bias control section 15 controls to adjust the frequency setting terminal (RT) to approximate reference voltage using bias current from the PNP bipolar transistors Q3 and Q4. Though it is not shown, bias current for activating the operational amplifier AMP1 is also generated at a constant current source circuit in which the bipolar transistor Q1 is incorporated as current input.

The PNP bipolar transistors Q5, Q6 and Q7 are constant current source as bias current supply to an error amplifier circuit ERR, a switching duty generating circuit PWM, an output transistor driving circuit DEV, respectively. These circuits constitutes a control section 17 for conducting: error amplification with respect to divided voltage of output voltage inputted from a (−IN) terminal of the DC/DC converter control circuit 80; switching control with respect to the PMOS transistor M1 in accordance with a driving signal from a (DRV) terminal of the DC/DC converter control circuit 80; and switching control for regulating output voltage to constant voltage.

A resistance element RT for setting oscillation frequencies and an NMOS transistor M2 are connected to points between the frequency setting terminal (RT) and ground voltage. An external control signal CTL from a (CTL) terminal of the DC/DC converter system 90 is inputted to a gate terminal of the NMOS transistor M2. It should be noted that a resistance element R5 for gate terminal voltage discharging is arranged between the gate terminal and the source of the NMOS transistor M2. Start-up of component elements surrounded with broken line indicated as a region 1A are controlled by an external control signal CTL.

Even though a (GND) terminal for supplying ground voltage, an (FB) terminal for phase correction of the error amplifier circuit are newly added, the DC/DC converter control circuit 80 can be constituted by six terminals, specifically, the two newly added terminals and the aforementioned four terminals, namely, the (VCC) terminal, the (RT) terminal, the (−IN) terminal, and the (DRV) terminal. The conventional DC/DC converter circuit 800 needs an eight-terminal package whereas the DC/DC converter 80 needs a six-terminal package.

Next, power saving mode function based on an external control signal CTL will be described. In case an external control signal CTL with low logic level for commanding power saving mode is inputted, the NMOS transistor M2 is set in a non-conductive state, whereby the current path between the frequency setting terminal (RT) and the ground voltage is opened, and current does not flow there between, accordingly. As a result, a current path connecting to the PNP bipolar transistor Q1 via the NPN bipolar transistor Q9 is not formed, and current is not inputted to the PNP bipolar transistor Q1 constituting a constant current source circuit.

Accordingly, bias current does not flow from any one of the constant current sources Q2 through Q7 out of the constant current source circuit Q1 through Q7. Consequently, a control section OSC of the oscillation circuit 16, the reference voltage circuit VREF, the operational amplifier AMP1, the NPN bipolar transistor Q8 as output stage of the operational amplifier AMP1, the error amplifier circuit ERR, the switching duty generating circuit PWM, and the output transistor driving circuit DRV are set in a non-active state to stop operation of those. Therefore, current consumed in the DC/DC converter control circuit 80 is tiny and power saving mode with a significantly current consumption can be realized.

In case an external control signal CTL with high logic level for commanding ordinary operation is inputted, the NMOS transistor M2 is set in a conductive state, whereby the current path between the frequency setting terminal (RT) and the ground voltage is established. As a result, there is established a current path leading to the ground voltage from the power source voltage VCC through the PNP bipolar transistor Q1 and NPN bipolar transistor Q9, in order, wherein current. Current is thus inputted to the PNP bipolar transistor Q1 which constitutes the constant current source circuit.

Accordingly, bias current as start-up current flows from all of the constant current sources Q2 through Q7 in the constant current source circuit Q1 through Q7. Consequently, the control section OSC of the oscillation circuit 16, the reference voltage circuit VREF, the operational amplifier AMP1, the NPN bipolar transistor Q8 as output stage of the operational amplifier AMP1, the error amplifier circuit ERR, the switching duty generating circuit PWM, and the output transistor driving circuit DRV are set in a active state to start operation of those. The reference voltage circuit VREF, the operational amplifier AMP1 and the NPN bipolar transistor Q8 as output stage of the operational amplifier AMP1 are set to start-up by Start-up current from the PNP bipolar transistors Q3 and Q4. Thereby, terminal voltage at the frequency setting terminal (RT) is controlled and adjusted to the reference voltage outputted from the reference voltage circuit VREF. Toward the ground voltage, the resistance element RT and NMOS transistor M2 are connected to the frequency setting terminal (RT) in serial. As long as an ON-resistance value of the NMOS transistor M2 made conductive due to an external control signal CTL with high logic level is a trifle compared with a resistance value of the resistance element RT, a current value inputted to the PNP bipolar transistor Q1 is approximately same as a current value obtained in case reference voltage is inputted to the resistance element RT. That is, the oscillation circuit 16 is activated depending on a resistance value of the resistance element RT and oscillation operation is conducted with predetermined frequencies determined by the resistance value and capacitance of the capacitor CT, whereby the state of operation shifts to ordinary state.

According to the first embodiment, start-up and stop control of the DC/DC converter control circuit 80 or the DC/DC converter system 90 incorporating the DC/DC converter control circuit 80 is conducted in a manner of connection control toward the frequency setting terminal (RT) of the resistance element RT arranged as impedance element or the like for controlling oscillation frequencies. Thereby, the control of oscillation frequencies can serve for start-up control of the DC/DC converter control circuit 80 and the DC/DC converter system 90. That is, switching control between active state and non-active state with respect to the DC/DC converter control circuit 80 can be done without arranging a dedicated terminal for inputting an external control signal CTL to the DC/DC converter control circuit 80. Thereby, the number of terminals of the DC/DC converter control circuit 80 can be reduced, which realizes miniaturization of a package size of the DC/DC converter control circuit 80. Consequently, degree of freedom of mounting with respect to the DC/DC converter system can be enhanced.

It should be noted that the NMOS transistor M2 arranged as switching section 11 controls connection between the frequency setting terminal (RT) and ground voltage so that the PNP bipolar transistors Q1 and Q2 arranged as the oscillation driving section 14 should start-up as a constant current circuit. Thereby, the bias control section 15 is activated and a bias voltage value is controlled and adjusted to a predetermined voltage value. Consequently, oscillation frequencies can be controlled and adjusted to predetermined frequencies.

Furthermore, a base current supply source as bias toward the NPN bipolar transistor Q9 arranged as bias section 13 is equivalent to power source voltage VCC of an externally-applied power source applied even while the DC/DC converter control circuit 80 stops operation. Therefore, even under a non-active sate, though current quantity of it is limited through the resistance element R4 arranged as the bias current supply resistance element 12, bias current is supplied as base current of the NPN bipolar transistor Q9 and flows out from its emitter connection. Consequently, the NPN bipolar transistor Q9 can be kept in an active state.

Different from the prior art, an external control signal CTL to set the internal circuit in a non-active state is never inputted to the DC/DC converter control circuit 80 directly when it is power saving mode. Furthermore, by connecting the constant current source circuit of the oscillation driving section 14 and the constant current source transistors Q3 through Q7 for bias current supply in a mirror connection manner, the internal circuits are started-up. That is, the bias current generating circuit for generating bias current in accordance with an external control signal CTL is not required.

Figure 4:
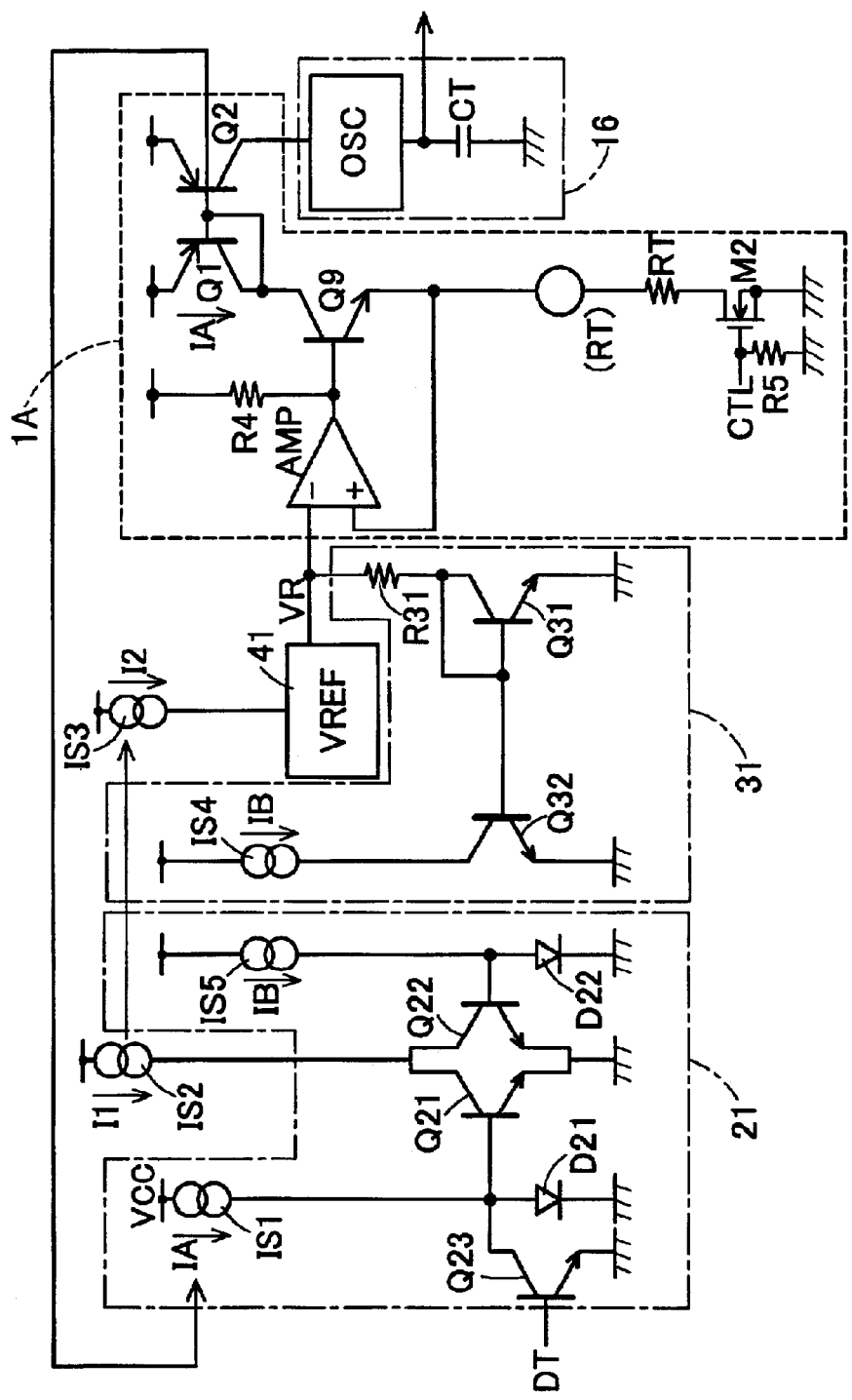
FIG. 4 is a circuit diagram showing a start-up control section of a DC/DC converter directed to a second embodiment.

FIG. 4 shows an aspect of a second embodiment corresponding to the second principle of the present embodiment. Since a start-up control section 1A of this embodiment is identical to that of the first embodiment, a description of it will be omitted.

In a switching section 21, there is arranged a constant current source IS1 connected to PNP bipolar transistors Q1 and Q2, constituting a constant current source circuit in the start-up control section 1A, in a manner of mirror connection. One of the terminals of the constant current source IS1 is connected to power source voltage VCC and the other terminal of it is connected to both an anode terminal of a diode element D21 and a base terminal of an NPN bipolar transistor Q21. A cathode terminal of the diode element D21 is connected to ground voltage. The diode element D21 and the NPN bipolar transistor Q21 an emitter terminal of which is connected to ground voltage constitute a current mirror-type constant current source circuit. A collector terminal of the NPN bipolar transistor Q21 is connected to power source voltage VCC through a constant current source IS2, thereby to supply start-up driving bias current IA (mentioned later) to the constant current source IS2.

Furthermore, constant current source IS5, the diode elements D22 and an NPN bipolar transistor Q22 are structured same as the constant current source IS1, the diode element D21, and the NPN bipolar transistor Q21, respectively. A collector terminal of the NPN bipolar transistor Q22 is connected to the constant current source IS2, thereby to supply constant driving bias current IBO (mentioned later) to the constant current source IS2.

Furthermore, a base terminal of the NPN bipolar transistor Q21 is connected to a collector terminal of an NPN bipolar transistor Q23. An emitter terminal of the NPN bipolar transistor Q23 is connected to ground voltage. A reference voltage detecting signal DT outputted from a reference voltage monitoring circuit (not shown) is inputted to a base terminal of the NPN bipolar transistor Q23 in case level of reference voltage VR outputted from a reference voltage (VREF) circuit 41 becomes same as or higher than a predetermined voltage value VRDT.

In a constant bias supplying section 31, there are arrange NPN bipolar transistor Q31 and Q32 a base terminals of which are connected to each other and emitter terminals of which are connected to ground voltage, whereby a current mirror type constant current source is constituted. Particularly, a collector terminal of the NPN bipolar transistor Q31 is connected to both its base terminal and a resistance element R31 so as to get the collector terminal biased to the reference voltage VR through the resistance element R31, whereby a current value depending on level of the reference voltage VR is set. A collector terminal of the NPN bipolar transistor Q32 is connected to a constant current source IS4. The constant current source IS4 is connected to a constant current source IS5 of the switching section 21 in a manner of mirror connection.

Bias current IA flows in the constant current source IS1. The bias current IA essentially flows to the constant current source circuit constituted by the PNP bipolar transistors Q1 and Q2 arranged in the start-up control section 1A. The bias current IA serves as bias current for setting oscillation frequencies through the PNP bipolar transistor Q2 as well as driving bias current (start-up driving bias IA) to the reference voltage (VREF) circuit 41 at the time of start-up. In FIG. 4, a current ratio of (the PNP bipolar transistor Q1/the constant current source IS1) is set to 1 and equivalent valued currents flow to the both, whereby start-up driving bias current IA flowing in the constant current source IS1 is set. However, the current ratio can be set arbitrarily. The start-up driving bias current IA flowing in the constant current source IS1 is delivered as bias current I1 for the constant current source IS2 by the diode element D21 and the NPN bipolar transistor Q21 while the NPN bipolar transistor Q23 is in non-conductive state (I1=IA).

When level of the reference voltage VR is same as or higher than base-emitter forward voltage VBE of the NPN bipolar transistor Q31 and there is established a current path leading to the NPN bipolar transistor Q31 through the resistance element R31 from the reference voltage VR, bias current IB responsive to level of the reference voltage VR and a resistance value of the resistance element R31 flows through the NPN bipolar transistor Q31. Current flows into the constant current source IS4 through the constant current source circuit constituted by the NPN bipolar transistors Q31 and Q32 and this current is further delivered and supplied to the constant current source IS5. FIG. 4 shows a case that a current ratio of (the constant current source IS4/constant current source IS5) is set to 1. However, the current ratio can be set arbitrarily. The bias current IB flowing in the constant current source IS5 is delivered as bias current I1 for the constant current source IS2 by the diode element D22 and the NPN bipolar transistor Q22 (I1=IB, or IA+IB).

The bias current I1 for the constant current source IS2 is delivered to the constant current source IS3 so as to get the reference voltage (VREF) circuit 41 biased as driving bias current I2. The driving bias current I2 is switched in response to a voltage value of the reference voltage VR when the NPN bipolar transistors Q31 and Q32 become conductive.

As to the constant current sources IS1 through IS5 simply indicated with legend of current source, detailed circuit structures of them are not shown in FIG. 4, however, these constant current sources can be made with the same circuit structure as the constant current source of the start-up control section 1A, which is constituted by the PNP bipolar transistors Q1 and Q2. Furthermore, not to mention, various modifications may be applicable to the constant current sources shown in FIG. 4. For example, MOS transistor or the like may substitute for bipolar transistor to constitute a constant current source, transistor size may be changed to adjust current value, an impedance element may be inserted at a base terminal or source terminal side, or a buffer transistor may be inserted at emitter terminal side or a drain terminal side to enhance current accuracy.

Furthermore, it should be noted that the diode elements D21 and D22 constituting a current mirror type constant current source circuit between the NPN bipolar transistors Q21 and Q22 are generally constituted by devices identical to the NPN bipolar transistors Q21 and Q22, respectively, for current accuracy reason.

Figure 5:
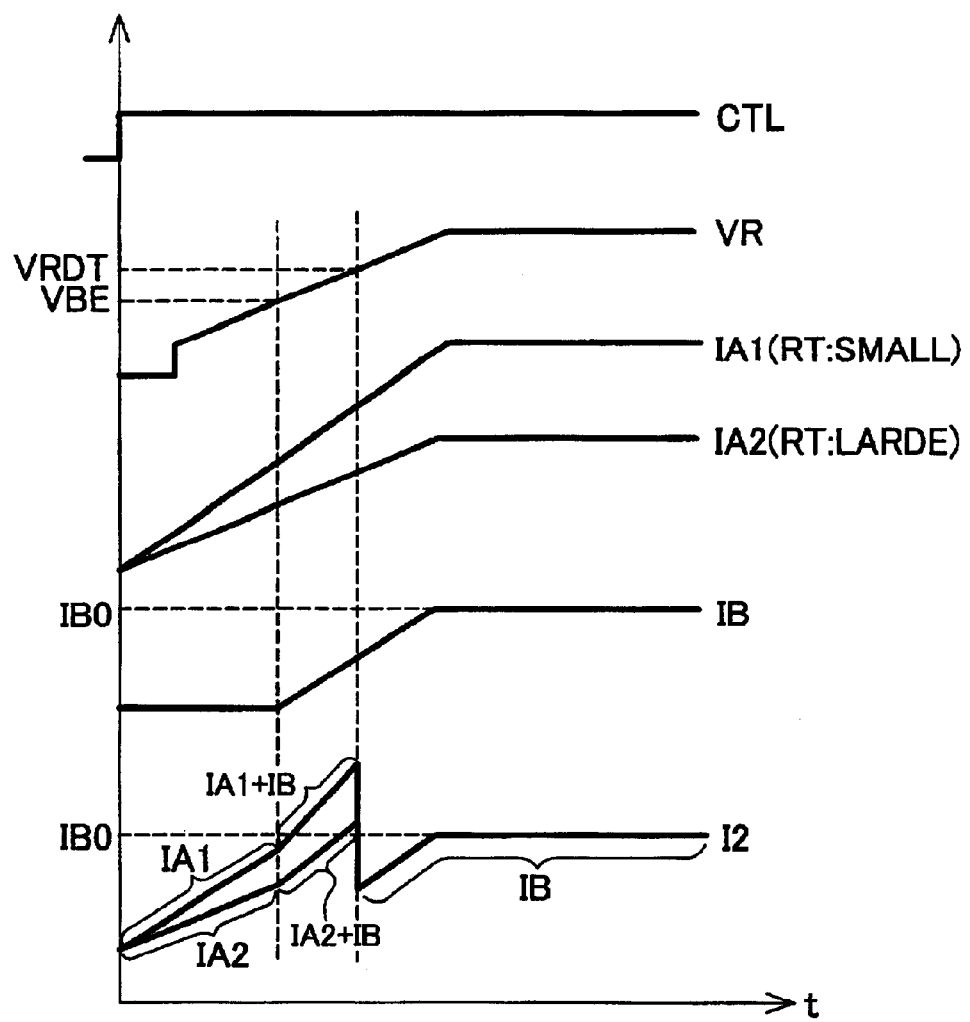
FIG. 5 is operational waveform of bias current at the time of start-up with respect to a second embodiment.

Next, here will be described switching manner of the driving bias current I2 to the reference voltage (VREF) circuit 41 during a period from start-up of the second embodiment until reaching an active state, by referring to FIG. 5. When an external control signal in high logic level is inputted, a current path from the start-up control section 1A to ground voltage by way of the PNP bipolar transistor Q1 is established and bias current IA flows there. Since the bias current IA gets a control section OSC for a oscillation circuit 16 biased and determines oscillation frequencies depending on resistance value of a resistance element RT, a current value of it differs depending on a resistance value of the resistance element RT. In case a resistance value of the resistance element RT is small, a value of the bias current IA is large in a constant state (IA1 in FIG. 5), whereas a resistance value of the resistance element RT is large, a value of the bias current is small in a constant state (IA2 in FIG. 5).

Since the NPN bipolar transistor Q32 is in a non-conductive state during a start-up period, start-up driving bias current IA is delivered to the constant current source IS3 through the constant current sources IS1 and IS2, whereby the reference voltage (VREF) circuit 41 is biased. Drive of the reference voltage (VREF) circuit 41 is started depending on escalation of the start-up driving bias current IA, and subsequently, reference voltage VR outputted rises.

When a voltage value of the reference voltage VR reaches base-emitter forward voltage of the NPN bipolar transistor Q31, a current path by way of the resistance element R31 and the NPN bipolar transistor Q31 is established, whereby a constant current source circuit constituted by the NPN bipolar transistors Q31 and Q32 operates. As a result, bias current IB is added to the constant current source IS2 through the constant current sources IS4, IS5, and the NPN bipolar transistor Q22 and an equation (I1=IA+IB) is thus obtained. The bias current IB is delivered to the constant current source IS3, thereby to drive the reference voltage (VREF) 41 as driving bias current I2. At this stage, level of the reference voltage VR has not reached a target voltage value. That is, the bias current IB is smaller than a target value of the constant driving bias current IBO.

When the reference voltage VR further rises and reaches a predetermined voltage value VRDT, a reference voltage detecting signal DT is detected and the NPN bipolar transistor Q23 becomes conductive. Start-up driving bias current IA for the constant current source IS1 is by-passed, whereby bias current I1 for the constant current source IS2 turns into bias current IB. Accordingly, the reference voltage (VREF) circuit 41 is driven depending on the level of the bias current IB generated in response to level of the reference voltage VR which the reference voltage (VREF) circuit 41 itself outputs.

After that, the reference voltage (VREF) circuit 41 shifts to a constant state and target leveled reference voltage VR is outputted from there. Thereby, bias current IB responsive to the reference voltage VR is supplied to the reference voltage (VREF) circuit 41 as constant driving bias IBO. Characteristic of the reference voltage VR depends on circuit structure of the reference voltage (VREF) circuit 41. However, the reference voltage changes a little due to temperature, in general. Therefore, the constant driving bias current IBO thus generated by the reference voltage VR is regarded as bias current which changes little.

In the second embodiment, there can be supplied driving bias current I2 which is little changeable and stable compared with a case to use start-up driving bias current IA, as driving bias current I2, current value of which changes depending on the resistance element RT to adjust oscillation frequencies in a constant state. Thereby, change of temperature characteristic of the reference voltage VR and change of voltage itself can be suppressed.

As a specific example of the reference voltage (VREF) circuit 41, a band gap reference (BGR) circuit or the like is applicable.

Figure 6:
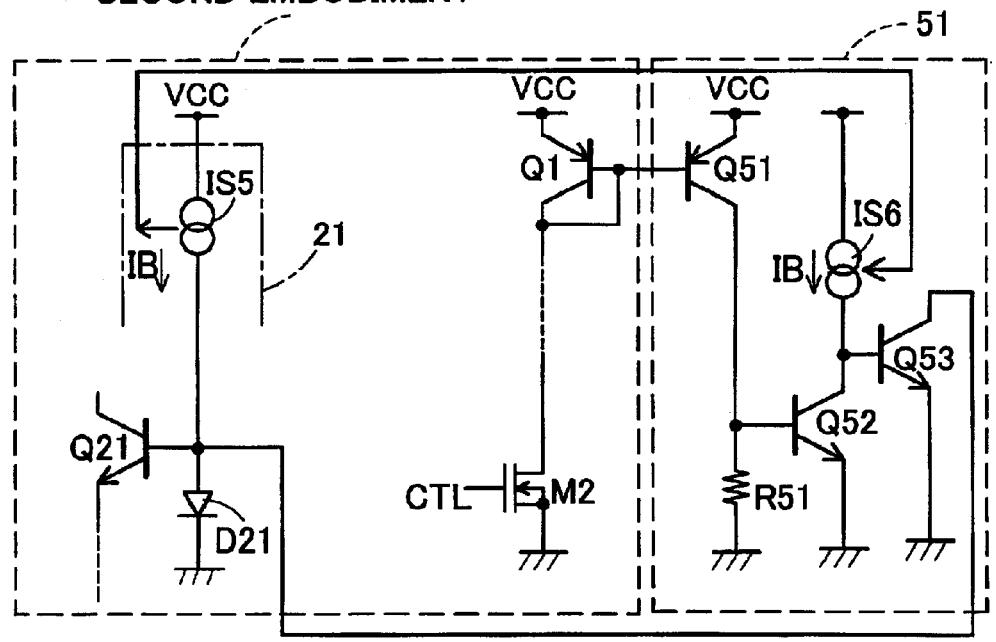
FIG. 6 is a circuit diagram showing a start-up control section of a DC/DC converter directed to a third embodiment.
Figure 7:
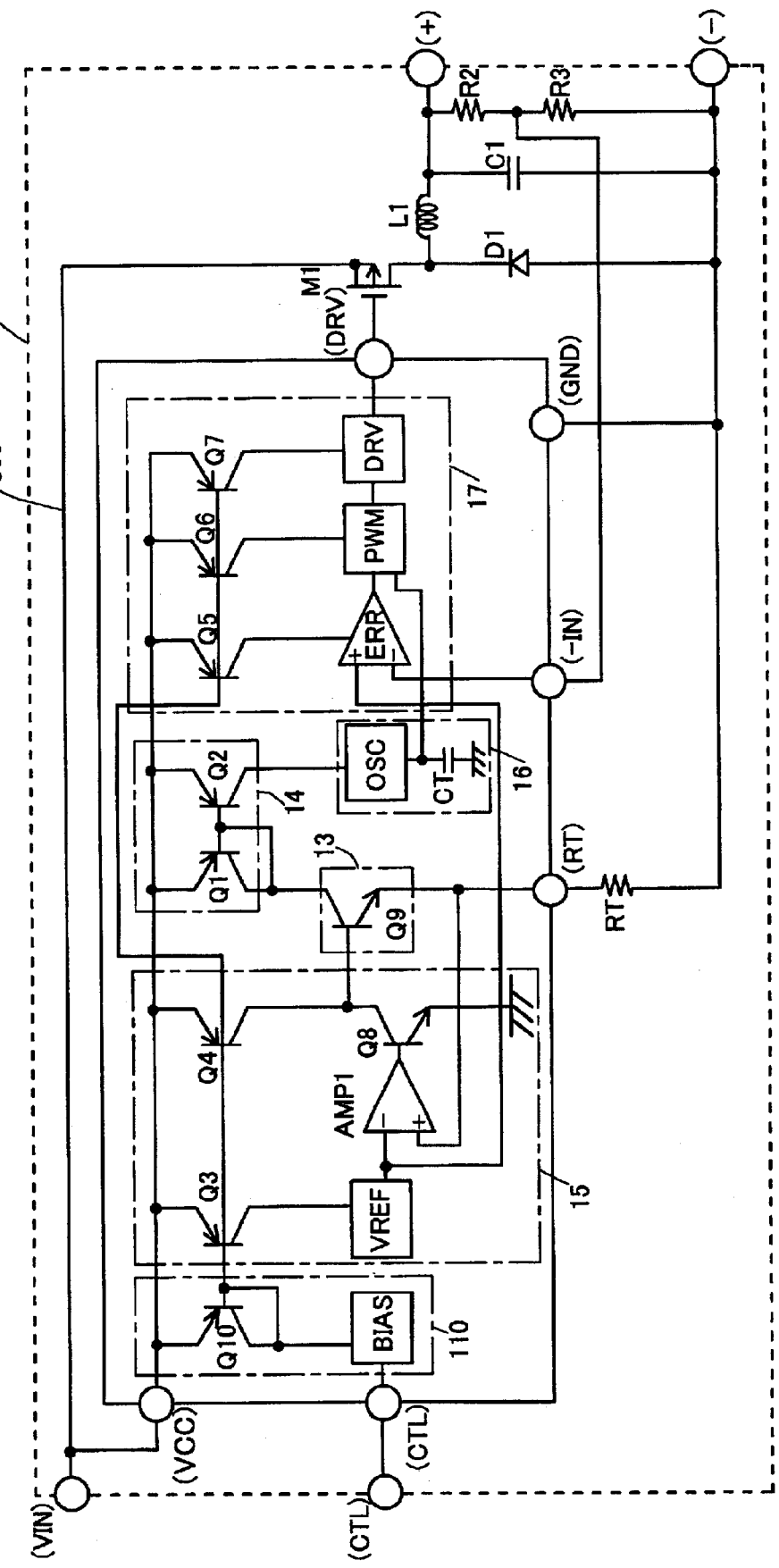
FIG. 7 is a circuit diagram showing a conventional DC/DC converter system.

FIG. 6 shows a configuration example of driving bias blocking circuit 51 directed to a third embodiment. The driving bias blocking circuit 51 is capable of shifting the reference voltage (VREF) circuit 41 in active state to non-active state promptly when an external control signal CTL in high logic level is to be shifted to low logic level in the DC/DC converter control circuit directed to the second embodiment.

In the driving bias blocking circuit 51, there is arranged a PNP bipolar transistor Q51 as constant current source connected to a bipolar transistor Q1 in a manner of mirror connection. A collector terminal of the PNP bipolar transistor Q51 is connected to both a resistance element R51 and a base terminal of an NPN bipolar transistor Q52. A collector terminal of the NPN bipolar transistor Q52 is connected to both a base terminal of an NPN bipolar transistor Q53 and a constant current source IS6 to which bias current IB flowing in a constant current source IS5 at a switching section 21 is delivered. Furthermore, a collector terminal of the NPN bipolar transistor Q53 is connected to a connection point of a diode element D21 at the switching section 21 and a base terminal of an NPN bipolar transistor Q21. Furthermore, the other terminal of the resistance element R51 and emitter terminals of the NPN bipolar transistor Q52, Q53 are connected to ground voltage and the other terminal of a constant current source IS6 is connected to power source voltage VCC.

When an external control signal CTL shifts to low logic level, current path by way of a PNP bipolar transistor Q1 is blocked, whereby flow of start-up driving bias current IA is blocked. As a result, the start-up driving bias current IA flowing in the PNP bipolar transistor Q51 as a constant current source is blocked, as well. Consequently, supply of base current to the base terminal of the NPN bipolar transistor Q52 is stopped and the NPN bipolar transistor Q52 becomes non-conductive, accordingly. As a result, bias current flowing in the constant current source IS6 is supplied to the base terminal of the NPN bipolar transistor Q53 and shunts the bias current IB from the constant current source IS5 supplied to the connection point of the diode element D21 and the base terminal of the NPN bipolar transistor Q21, whereby current supply to the constant current source IS2 is stopped and at the same time, bias current I2 at the constant current source IS3 runs out. The reference voltage (VREF) circuit 41 stops operation. Since the start-up driving bias current IA supplied to the constant current source IS1 does not flow at this stage, the start-up driving bias current IA never flows to the constant current source IS2 through the NPN bipolar transistor Q21.

According to the second and third embodiments, driving bias current I2 to the reference voltage (VREF) circuit 41 is switched to other type of driving bias current at the time of start-up and after start-up where internal operation is in a constant state in a meaning of active condition. Therefore, during a transitional period such as start-up time where control condition of the DC/DC converter control circuit has not yet been in a constant state, start-up driving bias current IA as driving bias current which can be supplied even while a transitional period can surely start-up the reference voltage (VREF) circuit 41. Under a stable constant condition, start-up driving bias current IA flowing at the time of start-up is switched to constant driving bias current IBO flowing while bias condition is stable. Therefore, the reference voltage (VREF) circuit 41 can output target leveled reference voltage VR. The reference voltage (VREF) circuit 41 can be started-up and the reference voltage can be kept at a target value in a constant condition after start-up, whereby operation condition can be set appropriately.

Furthermore, condition of the driving bias current I2 to the reference voltage VR can be kept constant under constant state, whereby change of temperature characteristic with respect to the reference voltage VR, which occurs when characteristic of the driving bias current I2 changes, and characteristic change of the reference voltage VR itself can be suppressed. In other words, stable reference voltage can be outputted in a stable state.

Furthermore, a reference voltage monitoring section such as under voltage lock out (abbreviated as UVLO hereinafter) circuit and the like monitors reference voltage VR outputted from the reference voltage (VREF) circuit 41 and outputs a reference voltage detecting signal DT as alarm signal in case the reference voltage VR is same as or higher than the predetermined voltage VRDT so that type of driving bias current I2 to the reference voltage (VREF) circuit 41 can be switched. Accordingly, in case the reference voltage (VREF) circuit 41 is driven with current same as or higher than a predetermined driving bias current, the reference voltage VR outputted from the reference voltage (VREF) circuit 41 exceeds the predetermined voltage value VRDT, rises up to target valued reference voltage and stays at the target value. Accordingly, as predetermined voltage value VRDT, the reference voltage VR should be set to a voltage value which sets the driving bias current I2 in constant state outputted depending on level of the reference voltage VR to same as or higher than a predetermined driving bias current value. Thereby, when the reference voltage VR reaches the predetermined voltage value VRDT, it is determined that transitional state at the time of start-up terminates, constant state starts, and the DC/DC converter circuit can switch types of the driving bias current.

Furthermore, at the time of start-up, constant current source circuit constituted by the PNP bipolar transistors Q1, and Q2 arranged at an oscillation driving section in the start-up control section 1A supplies driving bias current I2 to drive the reference voltage (VREF) circuit 41 and the reference voltage (VREF) circuit 41 supplies the driving bias current I2 to itself under constant situation. Accordingly, the driving bias current I2 to be supplied to the reference voltage (VREF) circuit 41 is supplied by the constant current source circuit at the oscillation driving section which is connected to the resistance element RT as internal impedance element at the time of start-up and controls oscillation frequencies depending on its resistance value whereas under constant state, the driving bias current I2 is supplied to the reference voltage (VREF) circuit 41 by itself.

Since the driving bias current I2 is supplied by the oscillation driving section which conducts start-up control at the time of start-up, the driving bias current I2 can be surely supplied to the reference voltage (VREF) circuit 41. Under constant state, the driving bias current I2 is supplied based on the reference voltage VR from the reference voltage (VREF) circuit 41 voltage at which is little changeable. Therefore, change degree of the driving bias current I2 is less than the start-up driving bias current IA which is, supplied from the oscillation driving section, much changeable depending on a resistance value of the resistance element RT. At the same time, change of temperature characteristic with respect to the reference voltage VR and change of its voltage value can be suppressed.

Furthermore, the driving bias blocking circuit 51 as driving bias blocking section blocks supply of the constant driving bias current IBO the reference voltage (VREF) circuit 41 supplies to itself when active state is switched and turned in to non-active state due to state transition of the external control terminal CTL. Accordingly, the reference voltage (VREF) circuit 41 with self-biased and driven under constant state can promptly and surely be shifted to non-active state when the external control terminal CTL in active state is shifted to non-active state.

Not to mention, the present invention is not limited to the above-described embodiment, but obviously various improvements and modifications are possible within a scope not deviating from the essentials of the invention.

For example, in the present embodiment, transistors constituting the constant current source circuit, the bias section 13, the bias control section 15 are constituted by bipolar transistors, however, they may be constituted by MOS transistors. In this case, the resistance element R4 directed to the first embodiment works as bias supply element for applying power source voltage VCC to the gate terminal under a non-active state instead of as bias supply element for supplying base current. In both cases, there is provided a function to keep a transistor constituting the bias section 13 in an active state when the internal operation is in a non-active state. Furthermore, in both cases, namely, in case bipolar transistors are used and in case MOS transistors are used, voltage relations and conduct type of transistors may be reversed.

Furthermore, connection order of the resistance element RT and NMOS transistor M2 connected in serial between the frequency setting terminal (RT) and the ground voltage may be reversed. Still further, a bipolar transistor may substitute for the NMOS transistor M2 and voltage relations and conduct type of transistors may be reversed.

In the present embodiments, terminal voltage at the frequency setting terminal (RT) is controlled and kept constant so that oscillation frequencies can be determined based on current flowing depending a resistance value of the resistance element RT. However, aspects of the present invention are not limited to the above case. Not to mention, oscillation frequencies may be set based on a voltage value obtained at the frequency setting terminal (RT) depending on a resistance value of the resistance element RT on condition that a current value flowing in the frequency setting terminal (RT) is kept constant.

The present embodiment describes a step-down type switching power source as an example, however, aspects of the present invention is not limited to this. Boosting type, inversion output type and the like can be applied to the inventive DC/DC converter control circuit and DC/DC converter system.

Figure 8:
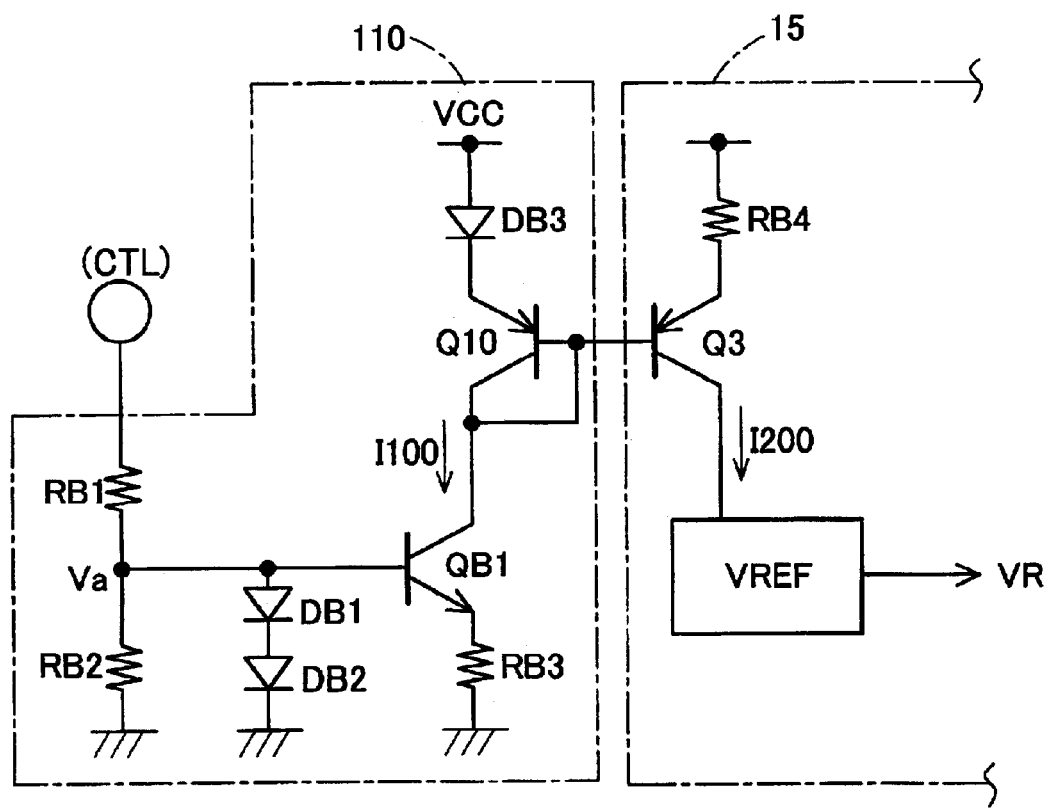
FIG. 8 is a circuit diagram showing a start-up control section of the conventional DC/DC converter.

Furthermore, the second and third embodiments describe a case that an aspect of the first embodiment is applied to the start-up control section 1A. However, the present invention is not limited to this. In case the start-up control section (FIG. 8) of the related art is arranged, the second and third embodiments are applicable.

Furthermore, in the second or third embodiment, bias current flowing in the PNP bipolar transistors Q3 through Q7 which get internal circuits biased as constant current source can be set constant regardless of oscillation frequency settings. Accordingly, even if setting of oscillation frequencies is high, bias current never increases, whereby increase of current consumption is avoided.

Still further, since amount of bias current to each internal circuit can be kept constant regardless of setting difference with respect to oscillation frequencies, characteristic of each internal circuit can be kept constant, as well. For example, frequency response characteristic of the operation amplifier AMP1 and the error amplifier ERR, and response speed characteristic of the switching duty generating circuit PWM and output transistor driving circuit DRV can be kept constant. Thereby, output characteristic of the DC/DC converter control circuit or the DC/DC converter system can be kept in a predetermined characteristic.

The present invention provides a DC/DC converter control circuit and a DC/DC converter system having high degree of freedom of mounting and achieving the following matters: (1) housing a DC/DC converter control circuit in a package miniaturized by reducing the number of terminals; (2) starting-up a power saving mode in response to an input of an external control signal to a DC/DC converter system; and (3) outputting stable voltage regardless of signal conditions of external terminals.

What is claimed is:

1. A DC/DC converter control circuit capable of switching internal operation state between active state and non-active state, the DC/DC converter control circuit comprising:

a frequency setting terminal for externally connecting an external impedance element to a point between the frequency setting terminal and external predetermined voltage;

a bias section for getting the external impedance element biased, the bias section being connected to the frequency setting terminal; and an oscillation driving section for controlling oscillation frequencies depending on an impedance value of the external impedance element, the oscillation driving section being connected to the external impedance element through the bias section;

wherein the DC/DC converter control circuit further comprises a control section for controlling the internal operation, the control section being activated based on a signal from the oscillation driving section, an auxiliary activator section for keeping the bias section in an active state when the internal operation is in a non-active state, and the oscillation driving section starts-up when a path between the frequency setting terminal and the external predetermined voltage which passes through the external impedance element is closed to be conductive by an external switching section which opens and closes the path.

2. A DC/DC converter control circuit according to claim 1, wherein switching between active state and non-active state is controlled by an external control signal inputted to the external switching section.

3. A DC/DC converter control circuit according to claim 1, wherein the control section includes a bias control section for controlling and adjusting a bias value of the external impedance element to a predetermined bias value by controlling the bias section.

4. A DC/DC converter control circuit according to claim 1, wherein the auxiliary activator section includes a bias supply element for supplying bias to the bias section from an externally-applied power source.

5. A DC/DC converter control circuit according to claim 4, wherein the externally-applied power source is power source voltage supplied from an external or ground voltage.

6. A DC/DC converter control circuit according to claim 1, wherein the bias section includes a bipolar transistor connected toward the frequency setting terminal in a manner of emitter connection.

7. A DC/DC converter control circuit according to claim 1, wherein the bias section includes a MOS transistor connected toward the frequency setting terminal in a manner of source connection.

8. A DC/DC converter control circuit according to claim 4, wherein the bias supply element includes a bias supply resistance element.

9. A DC/DC converter control circuit capable of switching internal operation state between active state and non-active state, the DC/DC converter control circuit comprising:
- a frequency setting terminal for externally connecting an external resistance element to a point between the frequency setting terminal and external predetermined voltage;
- a transistor for getting the external resistance element voltage biased, the transistor being connected to the frequency setting terminal; and
- an oscillation current source for controlling oscillation frequencies by outputting bias current depending on a resistance value of the external resistance element, the oscillation current source being connected to the external resistance element through the transistor;
- wherein the DC/DC converter control circuit further comprises a bias control section for controlling and adjusting voltage bias of the external resistance element to a predetermined voltage value by controlling the transistor, the bias control section being activated based on bias current from current source connected to the oscillation current source in a manner of mirror connection, other control sections for controlling the internal operation, the other control sections being activated based on bias current from current source connected to the oscillation current source in a manner of mirror connection, and a bias resistance element for getting the transistor biased when the bias control section is in a non-active state, and the oscillation current source starts-up when a path between the frequency setting terminal and the external predetermined voltage which passes through the external resistance element is closed to be conductive by an external switching transistor which opens and closes the path.

10. A DC/DC converter control circuit according to claim 9 further including a reference voltage section, wherein one of driving bias signals for driving the reference voltage section is selected at the time of start-up and after start-up where internal operation is in a active state.

11. A DC/DC converter control circuit according to claim 9 further including a reference voltage section, wherein one of driving bias current signals for driving the reference voltage section is selected at the time of start-up and after start-up where internal operation is in an active state.

12. A DC/DC converter control circuit according to claim 10 further including a reference voltage monitoring section for monitoring level of reference voltage outputted from the reference voltage section and alarming that the reference voltage is same as or higher than a predetermined voltage value, wherein one of the driving bias signals is selected in accordance with a alarming signal from the reference voltage monitoring section.

13. A DC/DC converter control circuit according to claim 11 further including a reference voltage monitoring section for monitoring level of reference voltage outputted from the reference voltage section and alarming that the reference voltage is same as or higher than a predetermined voltage value, wherein one of the driving bias current signals is selected in accordance with a alarming signal from the reference voltage monitoring section.

14. A DC/DC converter control circuit according to claim 10, wherein the driving bias for the time of start-up is supplied by the oscillation driving section.

15. A DC/DC converter control circuit according to claim 11, wherein the driving bias current for the time of start-up is supplied by the oscillation current source.

16. A DC/DC converter control circuit according to claim 10, wherein the driving bias for the internal operation under active state is supplied from the reference voltage section.

17. A DC/DC converter control circuit according to claim 11, wherein the driving bias current for the internal operation under active state is supplied from the reference voltage section.

18. A DC/DC converter control circuit according to claim 16 further including a driving bias blocking section for blocking supply of the driving bias from the reference voltage section to the reference voltage section itself when the internal operation in active state is switched to non-active state.

19. A DC/DC converter control circuit according to claim 17 further including a driving bias blocking section for blocking supply of the driving bias current from the reference voltage section to the reference voltage section itself when the internal operation in active state is switched to non-active state.

20. A DC/DC converter control circuit according to claim 18, wherein the driving bias blocking section blocks supply of the driving bias in accordance with a signal from the oscillation driving section.

21. A DC/DC converter control circuit according to claim 19, wherein the driving bias blocking section blocks supply of the driving bias current in accordance with bias current from the oscillation current source.

22. A DC/DC converter control circuit capable of switching internal operation state between active state and non-active state, wherein the DC/DC converter control circuit includes a reference voltage section, and one of driving bias signals for driving the reference voltage section is selected at the time of start-up and after start-up where internal operation is in an active state, and
- wherein the driving bias for the internal operation under active state is supplied from the reference voltage section; and
- further including a driving bias blocking section for blocking supply of the driving bias from the reference voltage section to the reference voltage section itself when the internal operation in active state is switched to non-active state.

23. A DC/DC converter system capable of switching internal operation state between active state and non-active state, the DC/DC converter system comprising:
- a DC/DC converter control circuit including a bias section for getting a frequency setting terminal biased and an oscillation driving section connected to the frequency setting terminal through the bias section; and
- an impedance element for controlling oscillation frequencies of the oscillation driving section depending on an impedance value, the impedance element being connected to a point between the frequency setting terminal and predetermined voltage;
- wherein the DC/DC converter system further comprises a control section for controlling the internal operation, the control section being activated based on a signal from the oscillation driving section, an auxiliary activator section for keeping the bias section in an active state when the internal operation is in a non-active state, and the oscillation driving section starts-up when a path between the frequency setting terminal and the predetermined voltage which passes through the impedance element is closed to be conductive by a switching section which opens and closes the path.

24. A DC/DC converter system according to claim 23, wherein switching between active state and non-active state is controlled by an external control signal inputted to the switching section.

25. A DC/DC converter system according to claim 23, wherein the control section includes a bias control section for controlling and adjusting a bias value of the impedance element to a predetermined bias value by controlling the bias section.

26. A DC/DC converter system according to claim 23, wherein the auxiliary activator section includes a bias supply element for supplying bias to the bias section from an externally-applied power source.

27. A DC/DC converter system according to claim 26, wherein the externally-applied power source is power source voltage supplied from an external or ground voltage.

28. A DC/DC converter system according to claim 23, wherein the bias section includes a bipolar transistor connected toward the frequency setting terminal in a manner of emitter connection.

29. A DC/DC converter system according to claim 23, wherein the bias section includes a MOS transistor connected toward the frequency setting terminal in a manner of source connection.

30. A DC/DC converter system according to claim 26 wherein the bias supply element includes a bias supply resistance element.

31. A DC/DC converter system capable of switching internal operation state between active state and non-active state, the DC/DC converter system comprising:
   a DC/DC converter control circuit including a transistor for getting a frequency setting terminal voltage biased and an oscillation current source connected to the frequency setting terminal through the transistor; and
   a resistance element for controlling oscillation frequencies of the oscillation current source depending on a resistance value, the resistance element being connected to a point between the frequency setting terminal and predetermined voltage;
   wherein the DC/DC converter system further comprises a bias control section for controlling and adjusting voltage bias of the resistance element to a predetermined voltage value by controlling the transistor, the bias control section being activated based on bias current from current source connected to the oscillation current source in a manner of mirror connection, other control sections for controlling the internal operation at the DC/DC converter control circuit, the other control sections being activated based on bias current from current source connected to the oscillation current source in a manner of mirror connection, and a bias resistance element for getting the transistor biased when the bias control section is in a non-active state, and the oscillation current source starts-up when a path between the frequency setting terminal and the predetermined voltage which passes through the resistance element is closed to be conductive by a switching transistor which opens and closes the path.

32. A DC/DC converter system according to claim 23 further including a reference voltage section, wherein one of driving bias signals for driving the reference voltage section is selected at the time of start-up and after start-up where internal operation is in an active state.

33. A DC/DC converter system according to claim 31 further including a reference voltage section, wherein one of driving bias current signals for driving the reference voltage section is selected at the time of start-up and after start-up where internal operation is in an active state.

* * * * *